United States Patent [19]
Keller

[11] Patent Number: 4,482,702
[45] Date of Patent: Nov. 13, 1984

[54] FL POLYESTERS

[75] Inventor: Teddy M. Keller, Alexandria, Va.

[73] Assignee: The United States of America as represented by the Secretary of the Navy, Washington, D.C.

[21] Appl. No.: 563,435

[22] Filed: Dec. 20, 1983

[51] Int. Cl.³ .............................................. C08G 63/68
[52] U.S. Cl. ..................................... 528/299; 528/70; 560/193; 560/197
[58] Field of Search .................. 528/70, 299; 560/193, 560/197

[56] References Cited

U.S. PATENT DOCUMENTS

| 2,902,473 | 9/1959 | Smith | 528/70 X |
|---|---|---|---|
| 3,016,361 | 1/1962 | Schweiker et al. | 528/299 X |
| 3,240,800 | 3/1966 | Severson | 528/299 X |
| 3,304,334 | 2/1967 | Jones | 568/811 |
| 3,332,902 | 7/1967 | Fein | 524/316 |
| 3,438,946 | 4/1969 | Lichstein et al. | 560/197 X |
| 4,238,602 | 12/1980 | Griffin | 528/299 |
| 4,379,912 | 4/1983 | Lu | 528/274 |

OTHER PUBLICATIONS

Schweiker et al., "Condensation Polymers Containing Fluorine I. Synthesis of Linear Polyesters from Fluorine–Containing Diols", J. Pol. Sci. vol. XXIV, pp. 33–41 (1957).
Wall, ed., *High Polymers*, vol. 25, "Fluoropolymers", pp. 202–203, 213–215, Wiley–Interscience, N.Y. (1972).
Filler, et al., "Fluorinated Esters, III., Diesters of Carboxylic Acids with Fluorine-containing Alcohols and Glycols", J.A.C.S. vol. 75, pp. 2693–2695 (1953).
Faurote et al., "Catalyst for Promoting Direct Esterification of Fluoroalcohols", Indus. and Eng. Chem., vol. 49, No. 2 (1957).

Primary Examiner—Lucille M. Phynes
Attorney, Agent, or Firm—Robert F. Beers; William T. Ellis; Barry A. Edelberg

[57] ABSTRACT

Fluorinated prepolymers prepared by non-stoichiometrically reacting an alcohol having at least alcoholic carbons and at least one trifluoromethylene group attached to each alcoholic carbon with a fluorinated polycarboxylic acid having at least one methylene group between each carboxyl group and each fluorinated carbon. The reaction is carried out neat while the reactants are in liquid form and typically in a flowing, non-reactive atmosphere.

23 Claims, No Drawings

FL POLYESTERS

Field of the Invention

This invention relates in general to low-surface energy polymers and more specifically to fluorinated polymers.

Background of the Invention

Perfluorinated polymers have long been employed as low surface energy coatings and materials. These polymers, despite their relatively high costs, have found uses in O-rings, gaskets, diaphragms, fuel tank sealants, and coatings. The high cost of these polymers, however, has limited the use of these polymers to relatively expensive items. Much of this cost may be attributed to the expense of perfluorination. A low surface energy polymer which is not highly fluorinated would eliminate much of this expense.

Previously, fluorinated hydroxyl-terminated polyesters have been developed from hexafluoropentanediol or octafluorohexanediol. While it has been possible to prepare high molecular weight polymers by reacting perfluorinated dicarboxylic compounds with polyhydric alcohols, such polymers are hydrolytically unstable and hence not suitable for practical usage.

OBJECTS OF THE INVENTION

It is an object of this invention to produce a relatively inexpensive, low surface energy polymer.

It is another object of this invention to produce a polymer which is not highly fluorinated yet has a low surface energy.

It is a further object of this invention to produce a polyester prepolymer from a tertiary fluorinated alcohol and a carboxylic acid.

It is yet another object of this invention to provide new flourine containing polyester prepolymers terminated with both dicarboxylic acid chlorides and dihydroxyl groups.

SUMMARY OF THE INVENTION

These and other objects are achieved by reacting a fluorinated alcohol, preferably tertiary, with a carboxylic acid having no flourination on the alpha carbon.

DETAILED DESCRIPTION OF THE PREFERRED EMBODIMENTS

The prepolymers of this invention are the products of the reaction of a polycarboxylic organic acid, or a derivative thereof (such as acid halide, acid anhydride, or an ester) with a fluorine-containing alcohol having at least two hydroxyl groups.

In this description and the claims that follow, the terms "polycarboxylic acid" means any of the carboxylic acids commonly reacted with alcohols to prepare polyesters. The term "alcohol" means any alcohol commonly reacted with polycarboxylic acids to produce polyesters. The term "acid" encompasses the straight acid (—OH group attached to acyl group, RCO—, where R is any organic group single-bonded to the carbonyl carbon) as well as the acid chloride, acid bromide, simple alkyl ester derivatives and acid anhydrides thereof unless specifically stated otherwise.

The preferred alcohols have the hydroxyl functions attached to carbons bonded to an aromatic ring. At least one $CF_3$ radical should be attached to each alcoholic carbon. If only one $CF_3$ group is attached to an alcoholic carbon, a methyl group or a hydrogen atom should also be attached to that carbon.

An perfluoroalkyl side chain may also be attached to the ring. Typically, the preferred alcohols have the following general formula:

 (I)

wherein:

$R_a$ is an arbitrarily large polymethylene di- or triradical, a aromatic di- or triradical, preferably a para or meta substitued benzene di- or triradical and is most preferably a benzene diradical, having no groups ortho to any fluorinated alcohol radical, $R_b$ is

H, or any perfluoroalkyl side chain;

$R_c$ is $CF_3$, $CH_3$ or H, and is most preferably $CF_3$; and
$R_d$ is $CF_3$, $CH_3$ or H, and is most preferably $CF_3$.

In this specification and the claims that follow, the term "polymethylene di- or triadical" encompasses fluorinated and unfluorinated, branched or unbranched polymethylene di- or triradical of any length unless otherwise stated. The use of fluorinated polymethylene di- or triradical $R_a$ groups, however, would in most cases be expensive and unnecessary.

Although almost any fluorinated polyfunctional alcohol may be used, the above described alcohols are preferred.

Preferred compounds of type (I) include 1,3-bis (2-hydroxylhexafluoro-2-propyl) benzene, 1,4-bis (2-hydroxylhexafluoro-2-propyl) benzene, 1,3,5-tris (2-hydroxylhexafluoro-2-propyl) benzene and any mixtures of the same.

Any polycarboxylic acid of the general formula:

 (II)

wherein

X represents —OH, Cl, Br, $OCH_3$, $OC_3H_7$ or an anhydride linkage and is most preferably Cl;

L represents an unfluorinated methylene, a polymethylene di- or triradical or a benzene di- or triradical having no fluorinated alpha carbons; and i is 0 when L is a diradical and 1 when L is a triradical and is most preferably 0 may be used as the polycarboxylic acid.

As noted above, any polymethylene or aromatic di- or triradical may be used as L, but the alpha carbons (those adjacent to the acid functions) must not be fluorinated. Fluorination of the alpha carbon causes the prepolymers formed by reaction with the alcohol to be hydrolytically unstable and of little or no practical use.

Representative examples of compounds of type (II) include adipic acid, glutaric acid, adipyl chloride, glutaryl chloride, adipyl anhydride, glutaryl anhydride, dimethyl adipate, dimethyl glutarate, diethyl adipate, diethyl glutarate, dipropyl adipate and dipropyl glutarate. Preferably, L is an unbranched unflourinated polymethylene diradical, $-(CH_2)_p-$, wherein p is an arbitrarily large integer and preferably equal to 3 or 4.

Preferably, the polycarboxylic acid and the alcohol are reacted neat, in a flowing, non-reactive atmosphere to remove any by-products of the reaction and thus shift the equilibrium of the reaction toward the formation of relatively high molecular weight polyesters.

Preferably, to facilitate the removal of the by-products, an inert gas such as nitrogen or argon is bubbled through the reaction medium. Since this is an equilibrium reaction, it is important to remove as completely as possible the by-product (e.g., hydrogen chloride) molecule.

When the reaction is run neat, the polycarboxylic acid and the alcohol are heated together so that both are in liquid form. If any of the reactants is a volatile liquid, as are most acid chlorides, the reaction should be carried out gradually, to avoid evaporation of reactant and a resulting upsetting of stoichiometry. As will be explained later, control of the stoichiometry of the reaction determines the nature of the reaction products.

If the straight polycarboxylic acid or an alkyl ester (eg. X in (I) is —OH or OR) is used, some means must be employed to remove the water or alcohol by-product. Typically, this may be accomplished by desiccation or by running the reaction at a sufficient temperature to drive off the by-product. As the boiling point of the reactants selected increases, the reaction may be ran at higher temperatures than used with lower boiling point reactants, where volatization of the reactants becomes a concern.

The temperature at which the reaction is carried out need only be sufficiently high to ensure that both reactants are in liquid form. Indeed, as previously indicated, excessive temperatures may hamper the formation of the desired polymer by driving off a volatile reactant. If adipyl chloride or glutaryl chloride are to be reacted with 1,3 bis(2-hydroxylhexafluoro-2-propyl) benzene, the reaction should be carried out by gradually, over about at least 48 hrs, increasing the temperature from 25°–140° C. and preferably from 25°–90° C. Above about 140° C., decomposition occurs.

To produce polyesters having a relatively high average molecular weight, several factors must be taken into account. First of all, the condensation reaction must be specific and must take place in high yield. Furthermore, the reactive groups must be present in equimolar ratio throughout the entire reaction. The equilibrium of the reaction must be shifted as far as possible to condensation. This means that the by-product molecules must be removed as formed. To enhance diffusion of the split-off products from the generally very viscous mixture, it is advantageous to agitate the mixture by stirring or by passing a dry inert gas through the medium. The reactants must be extremely pure. In particular, they must be free of monofunctional components, since these will block the end groups of the growing polymer and hence terminate condensation. When preparing linear polyesters, only bifunctional compounds may be present, since higher functional components will give rise to branching and crosslinking. The polyesters should be prepared under exclusion of oxygen to avoid oxidative decomposition since the reactions are often carried out at elevated temperatures. If these requirements are not totally met, then lower to moderate molecular weight polyesters will be obtained.

Linear polyesters of varying molecular weight can be made by using ratios of a dicarboxylic acid chloride to a diol which are less than unity. When an excess of diol is used, the chain endings are primarily hydroxyl group which is beneficial for certain extensions and cross-linking reactions. Similarly, diacid chloride terminated polyester prepolymers can be obtained by using an excess of diacid chloride. For example, the following reactions illustrate the formation of prepolymers according to this invention:

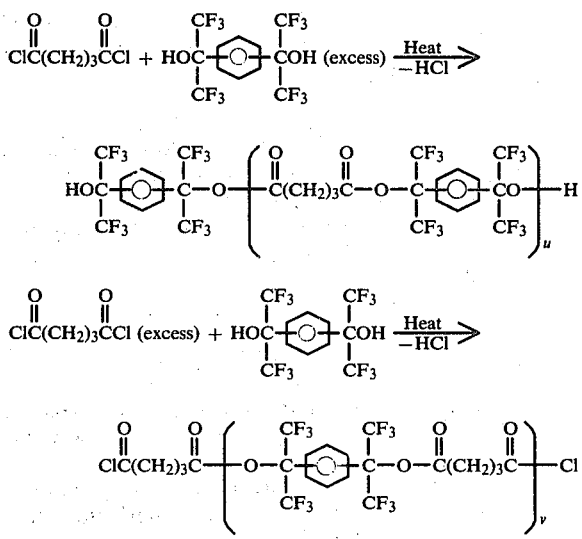

wherein
u and v are arbitrarily large integers.

The new fluorinated polymers and prepolymers exhibit good wetting properties and adhere strongly to Teflon TM. This observation indicates that the new polyesters have surface energy values similar to or below that of Teflon TM. Because the novel polymers need not be highly fluorinated but need only contain trifluoromethyl groups (on at least 2 alcoholic carbons) these polymers are much cheaper to produce than standard highly fluorinated acrylics.

Chain extension of the prepolymers of this invention can lead to fluoroelastomers with several interesting properties. It is clear that as the total fluorine content of a polymer increases, solubility in common hydrocarbon solvents decreases. For this reason, the reaction of a diacid chloride polyester prepolymer of this invention with a fluorine-containing diol should produce a solvent resistant as well as thermally stable elastomer. Fluorine-containing elastomers have been found extremely useful for application in aircraft and other vehicles where elastomers having good hydrocarbon fuel, lubricant, hydraulic fluid and aqueous acid and salt resistance, together with high temperature resistance and low temperature flexibility are used for such applications as gas tank sealants, o-rings, fuel conduits, etc. The hydroxyl-terminated prepolymer could be extended and cross-linked by reaction with poly-isocyanates to afford new polyurethanes. In essence, the new fluorinated polyester prepolymers could be reacted with an array of functional groups known to react with carboxylic-and hydroxyl groups to produce an entire new series of fluorine-containing polymers.

EXAMPLES

Having described the invention in general, the following examples are being given to illustrate the principles of the invention and are not intended to limit the scope of the invention in any manner.

EXAMPLE 1

Adipyl chloride (0.80 g, 4.91 mmol) and 1,3 bis (2-hydroxylhexafluoro-2-propyl) benzene (2.01 g, 4.91 mmol) were weighed into a 2-necked, 15 ml pear-shaped flask equipped with a condenser and a gas inlet tube. Upon mixing, it was observed (using litmus paper) that hydrogen chloride was being evolved even at room temperature. An initial infrared spectrum of mixture showed that two carbonyl absorptions were prominent: 1815 and 1700 cm$^{-1}$, due apparently to free and associated bands, respectively. Further, infrared spectra included the presence of both free and associated hydroxyl bands. As the reaction progressed, another carbonyl absorption centered at 1780 cm$^{-1}$ and assigned to the fluorine-containing polyester grew in intensity with a corresponding reduction in the free hydroxyl band. While bubbling dry argon through the medium, the reaction mixture was heated at 55° C. for 3 hours, at 85° C. for 18 hours, at 140° C. for 24 hours, and at 150° C. for 8 hours. Thermal gravimetric analysis of the mixture showed a weight loss commencing at 140° C., which was below the reaction temperature maximum. The polyester had a number average molecular weight of 1180 as determined by Vapor Phase Osmometry.

EXAMPLE 2

Glutaryl chloride (0.83 g, 4.88 mmol) and 1,3-bis (2-hydroxylhexafluoro-2-propyl) benzene (2.00 g, 4.88 mmol) were weighed into a 2-necked, 15 ml pear-shaped flask equipped with a condenser and a gas inlet tube. Upon mixing, a reaction ensued which was characterized by the strong evolution of hydrogen chloride. After the initial reaction had subsided to some extent, the temperature of the reaction mixture was gradually increased over a period of 48 hours to 140° C. An infrared spectrum showed that both hydroxyl and acid chloride groups were still present. No significant change in the infrared was observed upon further heating at 140° C. for 24 hours. During the entire reaction period, dry argon was passed through the reaction mixture at a slow rate. While maintaining the temperature at 140° C. for 15 minutes, a vacuum was applied at the end of the reaction. The resulting linear fluorine-containing polyester had a number average molecular weight of 1307 as determined by Vapor Phase Osmometry.

The following example shows the thermal instability of the polyester bond at elevated temperatures and the difficulties which are encountered in attempting to obtain high molecular weight polyesters from the reaction of equimolar quantities of a fluorinated tertiary diol and a dicarboxylic acid chloride.

EXAMPLE 3

Using the method of Example 1, glutaryl chloride (0.41 g, 2.44 mmol) and 1,3-bis (2-hydroxylhexafluoro-2-propyl) benzene (1.01 g, 2.44 mmol) were weighed into a 10 ml pear-shaped flask equipped with a condenser and a gas inlet tube. The mixture was heated at 55° C. for 4 hours, at 85° C. for 17 hours, and at 130° C. for 24 hours. The evolution of hydrogen chloride had ceased. The reaction content was extremely viscous at 130° C. An infrared spectrum of the mixture still showed strong absorptions at 3600–3400 and at 1815 amd 1700 cm$^{-1}$, attributed to hydroxyl and acid chloride groups, respectively. Further heating of the mixture at 150° C. for 6 hours and 160° C. for 18 hours resulted in a vast viscosity decrease and the sublimation of a white solid which was trapped by the condenser. From a comparison of the infrared spectra especially the positions of the carbonyl absorptions, it was observed that the content remaining in the reaction mixture and the white solid were not identical. No further work was done to identify the white solid. The number average molecular weight of the material remaining in the reaction vessel was 717 as determined by Vapor Phase Osmometry.

EXAMPLE 4

Adipyl chloride (0.37 g, 2.01 mmol) and 1,3-bis (2-hydroxylhexafluoro-2-propyl) benzene (1.01 g, 2.45 mmol) were weighed into a 10 ml pear-shaped flask equipped with a condenser and a gas inlet tube. The reactants were gradually heated to 130° C. over a 48 hour period while passing dry argon through the reaction mixture. After the reaction was complete as noted by cessation of hydrogen chloride evolution and the disappearance of the carbonyl absorption at 1815 cm$^{-1}$ and the appearance of a new carbonyl band at 1780 cm$^{-1}$, a vacuum was applied for 30 minutes to remove any residual hydrogen chloride. The resulting linear fluorine-containing polyester prepolymer had a number average molecular weight of 2111.

The linear polyester prepolymer as formed above, may be chain-extended and/or cross-linked with an array of functional groups known to react with hydroxyl groups to produce an entire new series of fluorine-containing polymers. The following example demonstrates how the hydroxyl-terminated prepolymer may be extended and cross-linked by reaction with a diisocyanate.

EXAMPLE 5

The linear fluorine-containing polyester prepolymer (0.5 g), prepared as described in Example 4, was mixed with 1,6-diisocyanatohexane (0.04 g) and a catalytic amount of dibutyl tin dilaurate in 2 ml of methylene chloride. After the methylene chloride was evaporated, the mixture was heated at 50° C. for 2 hours, at 85° C. for 1 hour, and at 110° C. for 8 hours. The linear, diisocyanate extended, fluorine-containing polyester prepolymer was transformed by this treatment into a cross-linked material which was insoluble in common organic solvents.

EXAMPLE 6

Using the method of Example 4, glutaryl chloride (1.12 g, 6.55 mmol) and 1,3-bis (2-hydroxylhexafluoro-2-propyl) benzene (1.99 g, 4.87 mmol) were weighed into a 10 ml, pear-shaped flask and the reactants were gradually heated to 130° C. over a 48 hour period while passing dry argon through the reaction mixture. After the reaction was complete as determined by the cessation of hydrogen chloride evolution and the disappearance of the hydroxyl absorption in the infrared spectrum, a vacuum was applied for 15 minutes to remove any residual hydrogen chloride. The fluorine-containing diacid chloride-terminated polyester prepolymer had a number average molecular weight of 2718.

Chain extension could be achieved by reacting the diacid chloride-terminated polyester prepolymer with an array of functional groups known to react with acid chlorides.

In these examples, the reaction of equimolar quantities of dicarboxylic acid chloride, e.g., adipyl chloride and glutaryl chloride, and 1,3-bis (2-hydroxylhexafluoro-2-propyl) benzene did not produce high molecular weight polyesters (see Examples 1–3). The reaction was monitored both by infrared spectroscopy (hydroxyl and carbonyl absorptions) and by the evolution of hydrogen chloride, the by-product. Attempts to push the reaction to completion by increasing the temperature resulted in a viscosity decrease and the evaporation and/or sublimation of a while solid from the reaction mixture. The fluorine-containing polyester is unstable at elevated temperatures. The degradation upset the equimolar balance resulting in low molecular weight polyesters.

Satisfactory lower to moderate molecular weight fluorine-containing polyesters were made by using ratios of dicarboxylic acid chloride and 1,3-bis (2-hydroxyl-hexafluoro-2-propyl) benzene (diol) less than unity (see Examples 4 and 6). By using an excess of either dicarboxylic acid chloride or diol, the reaction was carried to completion as determined by monitoring the hydroxyl and carbonyl absorptions in the infrared spectra. When an excess of diol was used, the chain endings were primarily hydroxyl groups, which are beneficial for certain extensions and cross-linking reactions. In a like manner, dicarboxylic acid chloride-terminated polyester prepolymers were prepared by using an excess of diacid chloride. In essence, by controlling the viscosity and molecular weight of the polycondensate, fluorine-containing polyester prepolymers were obtained.

Obviously many modifications and variations of the present invention are possible in light of the above teachings. It is therefore to be understood that, within the scope of the appended claims, the invention may be practiced otherwise than as specifically described.

What is claimed and desired to be secured by letters patent of the United States is:

1. A prepolymer comprising the product of a polycarboxylic acid having at least one methylene group between each carboxylic group and any fluorinated carbon and an alcohol having at least two alcoholic carbons with 1 to 2 trifluoromethyl groups, 0 or 1 methyl groups and 0 or 1 hydrogens attached to each alcoholic carbon and no other pendant groups attached to said alcoholic carbons, said reactants having been reacted in non-stoichiometric ratios.

2. The prepolymer of claim 1 wherein said alcohol has the general structure:

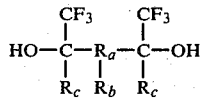

wherein:
$R_a$ is an arbitrarily large polymethylene di- or triradical or aromatic di- or triradical having no substitution ortho to a fluorinated alcohol radical;
$R_b$ is H, any perfluoroalkyl group, or

$R_c$ is $CF_3$, $CH_3$ or H; and
$R_d$ is $CF_3$, $CH_3$ or H.

3. The prepolymer of claim 2 wherein said acid has the general formula:

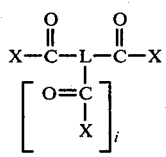

wherein
X represents —OH, Br, $OCH_3$, $OC_2H_5$, $OC_3H_7$ or an anhydride linkage;
L represents unfluorinated methylene, a polymethylene di-or triradical group having no fluorinated alpha carbons or a para or meta substituted benzene di- or triradical; and,
i is 0 when L is a diradical and 1 when L is a triradical.

4. The prepolymer of claim 3 wherein $R_b$ is H.

5. The prepolymer of claim 4 wherein $R_a$ is a para or meta substituted benzene diradical or a polymethylene di- or triradical.

6. The prepolymer of claim 5 wherein $R_c$ is $CF_3$ or H.

7. The prepolymer of claim 6 wherein $R_a$ is a benzene diradical.

8. The prepolymer of claim 7 wherein $R_c$ is $CF_3$.

9. The prepolymer of claim 8 wherein $R_a$ is a meta-substituted benzene triradical and $R_b$ is

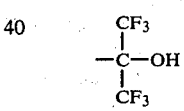

10. The prepolymer of claim 8 wherein i is 0.

11. The prepolymer of claim 10 wherein L represents $-\text{(CH}_2\text{)}_p-$ and p is any integer.

12. The prepolymer of claim 11 wherein p is 3.

13. The prepolymer of claim 11 wherein p is 4.

14. The composition of claim 11 wherein X is Cl.

15. The prepolymer of claim 14 wherein said acid is chosen from the group consisting of adipyl chloride and glutaryl chloride.

16. The prepolymer of claim 3 wherein $R_a$ is a benzene triradical.

17. A polymer consisting of the reaction product of stoichiometric amounts of an alcohol selected from the group consisting of 1,3-bis (2-hydroxylhexafluoro-2-propyl) benzene, 1,4-bis (2-hydroxylhexafluoro-2-propyl) benzene, 1,3,5-tris (2-hydroxylhexafluoro-2propyl) benzene and mixtures thereof and an acid selected from the group consisting of adipyl chloride and glutaryl chloride.

18. A prepolymer consisting of the reaction product of an alcohol selected from the group consisting of 1,3-bis (2-hydroxylhexaflouro-2-propyl) benzene, 1,4-bis (2-hydroxylhexafouro-2-propyl) benzene and mixtures thereof and an acid selected from the group consisting adipyl chloride and glutaryl chloride, said alcohol and polycarboxylic acid having been reacted in nonstoichiometric ratios.

19. The prepolymer of claim 18 wherein a molar excess of said alcohol has been reacted with said polycarboxylic acid.

20. The prepolymer of claim 1 wherein said dicarboxylic acid is chosen from the group consisting of adipic acid, glutaric acid, adipyl chloride, glutaryl chloride, adipyl anhydride, glutaryl anhydride, dimethyl adipate, dimethyl glutarate, diethyl adipate, diethyl glutarate, dipropyl adipate and dipropyl glutarate.

21. A method of preparing a fluorinated polyester prepolymer which comprises:
  selecting a polycarboxylic acid represented by the general formula:

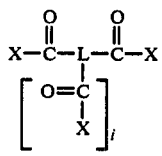

wherein X represents —OH, Br, OCH$_3$, OC$_2$H$_5$, OC$_3$H$_7$ or an anhydride linkage, L represents unfluorinated methylene, a polymethylene di- or triradical group having no fluorinated alpha carbons or a para or meta substituted benzene di- or triradical, and i is 0 when L is a diradical and 1 when L is a triradical;

selecting an alcohol represented by the general formula:

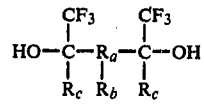

wherein:
$R_a$ is an arbitrarily large polymethylene di- or triradical or aromatic di- or triradical having no substitution ortho to a fluorinated alcohol radical,
$R_b$ is H, any perfluoroalkyl group, or

$R_c$ is CF$_3$, CH$_3$ or H, and
$R_d$ is CF$_3$, CH$_3$ or H;
admixing said polycarboxylic acid and alcohol, as liquids, in an inert atmosphere; and
agitating to remove gaseous byproducts until the reaction between said acid and alcohol is complete.

22. The method of claim 21 wherein a stoichiometric excess of said polycarboxylic acid is being admixed with said alcohol.

23. The method of claim 21 wherein a stoichiometric excess of said alcohol is being admixed with said polycarboxylic acid.

* * * * *